US008437763B2

(12) United States Patent
Venkatachalam

(10) Patent No.: US 8,437,763 B2
(45) Date of Patent: May 7, 2013

(54) MECHANISMS TO UPDATE A SERVING BASE STATION WITH THE CSG MEMBERSHIPS OF A MOBILE STATION

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 12/911,394

(22) Filed: Oct. 25, 2010

(65) Prior Publication Data

US 2011/0130115 A1 Jun. 2, 2011

Related U.S. Application Data

(60) Provisional application No. 61/254,620, filed on Oct. 23, 2009.

(51) Int. Cl.
*H04W 36/00* (2009.01)
*H04W 72/00* (2009.01)
*H04W 4/00* (2009.01)
*H04M 11/00* (2006.01)

(52) U.S. Cl.
USPC ........... 455/444; 455/434; 455/403; 455/438; 455/453; 370/338

(58) Field of Classification Search .................. 455/434, 455/403, 444, 438, 453; 370/338
See application file for complete search history.

(56) References Cited

U.S. PATENT DOCUMENTS

| | | | |
|---|---|---|---|
| 6,701,150 B1 * | 3/2004 | Huang et al. | 455/439 |
| 7,613,444 B2 * | 11/2009 | Lindqvist et al. | 455/403 |
| 2008/0293420 A1 | 11/2008 | Jang et al. | |
| 2009/0070694 A1 * | 3/2009 | Ore et al. | 715/764 |
| 2009/0186615 A1 | 7/2009 | Kwon et al. | |
| 2009/0279430 A1 * | 11/2009 | Huber et al. | 370/230.1 |
| 2009/0286512 A1 * | 11/2009 | Huber et al. | 455/411 |
| 2010/0113032 A1 * | 5/2010 | Lee et al. | 455/437 |

FOREIGN PATENT DOCUMENTS

| | | |
|---|---|---|
| KR | 10-2009-0008055 A | 1/2009 |
| KR | 10-2009-0091778 A | 8/2009 |
| WO | 2011/050364 A2 | 4/2011 |

OTHER PUBLICATIONS

International Search Report and Written Opinion received for PCT Patent Application No. PCT/US2010/053971, mailed on Jun. 29, 2011, 9 pages.
"International Application Serial No. PCT/US2010/053971, International Preliminary Report on Patentability mailed May 3, 2012", 6 pgs.

* cited by examiner

*Primary Examiner* — Ariel Balaoing
(74) *Attorney, Agent, or Firm* — Schwegman, Lundberg & Woessner, P.A.

(57) ABSTRACT

Mechanisms to update a serving BS with the CSG memberships of a MS are generally presented. In this regard, a base station is introduced including a wired backbone interface to communicate with a plurality of macro base stations and a plurality of femto base stations, and control logic, the control logic to identify one or more femto base station(s) that a mobile station is authorized to access, and the control logic to generate a request for the mobile station to scan for a specific femto base station which the mobile station is authorized to access. Other embodiments are also described and claimed.

17 Claims, 3 Drawing Sheets

MECHANISMS TO UPDATE A SERVING BASE STATION WITH THE CSG MEMBERSHIPS OF A MOBILE STATION

CLAIM OF PRIORITY

The present application claims priority to provisional application 61/254,620 filed on Oct. 23, 2009, which is incorporated by reference in its entirety.

FIELD

Embodiments of the present invention may relate to the field of broadband wireless networks, and more specifically to mechanisms to update a serving BS with the CSG memberships of a MS.

BACKGROUND

Femtocells are low-power wireless access points that operate in licensed spectrum to connect standard mobile devices to a mobile operator's network using residential DSL or cable broadband connection. See, for example, www.femtoforum.com. Femtocells allow service providers to reduce network operation cost, offer better pricing and extend their service coverage indoors, especially where access would otherwise be limited or unavailable. In the case where a mobile station is authorized to access a femtocell (i.e. is part of the closed subscriber group (CSG) membership), it may be advantageous for a serving base station to handoff the mobile station to such a femtocell to reduce loading.

BRIEF DESCRIPTION OF THE DRAWINGS

Embodiments of the present invention may become apparent from the following detailed description of arrangements, example embodiments, and the claims when read in connection with the accompanying drawings. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
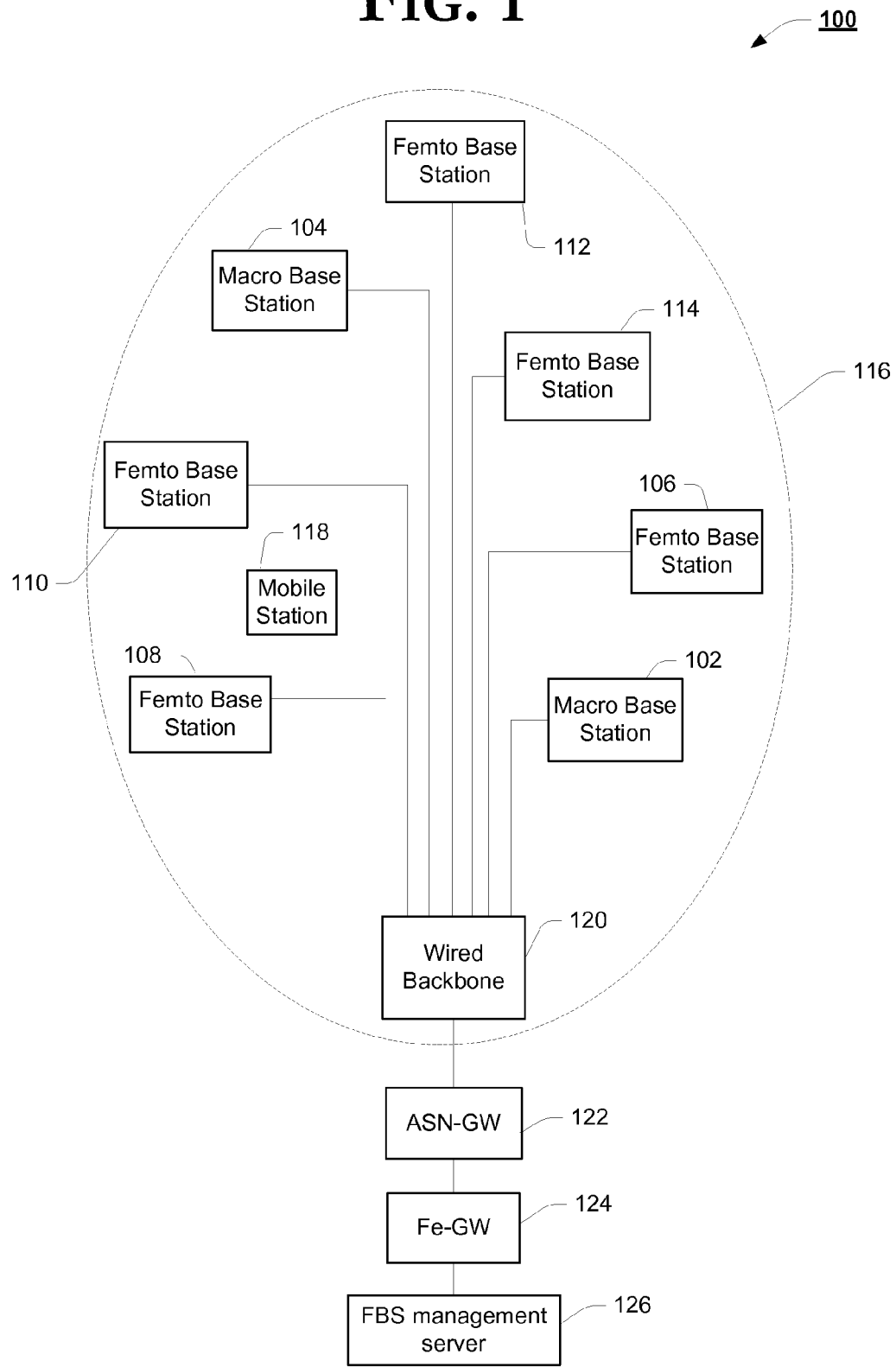
FIG. 1 is a block diagram of an example wireless broadband network suitable for implementing mechanisms to update a serving BS with the CSG memberships of a MS, in accordance with one example embodiment of the invention.

FIG. 1 is a block diagram of an example wireless broadband network suitable for implementing mechanisms to update a serving BS with the CSG memberships of a MS, in accordance with one example embodiment of the invention. Wireless broadband network 100 is intended to represent a broadband wireless network that supports mobile devices. In one embodiment, wireless broadband network 100 complies with a revision of the IEEE 802.16 standard, for example IEEE standard 802.16e-2005. In another embodiment, wireless broadband network 100 complies with a different standard. In accordance with the illustrated example embodiment, wireless broadband network 100 may include one or more of macro base stations 102 and 104, femto base stations 106, 108, 110, 112 and 114, service area 116, mobile station 118, wired backbone 120, access service network gateway (ASN-GW) 122, function entity gateway (Fe-GW) 124 and femto base station (FBS) management server 126 coupled as shown in FIG. 1.

Base stations 102-114 provide wireless broadband network access to mobile stations, such as mobile station 118. Macro base stations 102 and 104 may, for example, represent service provider-maintained base stations on towers or buildings, for example. Macro base stations 102 and 104 may include control logic and other components as described in reference to FIG. 2. Femto base stations 106, 108, 110, 112 and 114 may represent lower-power, user-maintained base stations in homes and offices, though the present invention is not so limited. In one embodiment, a service provider may authorize a subscriber to access wireless broadband network 100, for example through mobile station 118, via any macro base station, while access via each femto base station may need to be authorized by the user/owner of the femto base station. Base stations (BS) 102-114 may be interchangeably referred to as enhanced Node B's (eNB) or access points (AP). The terms BS, eNB and AP may be conceptually interchanged depending on which wireless protocol is being used, so a reference to BS herein may also be seen as a reference to either eNB or AP.

Service area 116 may represent a geographical extent of wireless broadband network 100. In one embodiment, service area 116 may include regions where service from a macro base station is not possible, for example due to terrain or obstructions (not shown).

Mobile station 118 represents any mobile device that connects to wireless broadband network 100. For example, mobile station 118 may represent, but is not limited to, a laptop, netbook, cell phone, mobile internet device, tablet, personal data assistant, etc, with wireless broadband capabilities and access. Mobile station 118 may travel with a user such that mobile station 118 becomes further away from some base stations and closer to other base stations. Mobile station (MS) 118 may be interchangeably referred to as a subscriber station (SS) or user equipment (UE) or station (STA). The terms MS, SS, UE or STA may be conceptually interchanged depending on which wireless protocol is being used, so a reference to MS herein may also be seen as a reference to SS, UE or STA.

Wired backbone 120 allow femto and macro base stations of service area 116 to communicate with each other and with ASN-GW 122, Fe-GW 124, and FBS management server 126. While shown as being a unified backbone for clarity, wired backbone 120 may comprise a variety of mediums and infrastructure in diverse locations, for example, fiberoptic cables, coaxial cables, copper wires, etc.

ASN-GW 122 may be present in wireless broadband network 100 to provide gateway services, for example between access resources and service resources. In some embodiments, ASN-GW 122 may be referred to by other names or its function performed by other resources.

Fe-GW 124 may be present in wireless broadband network 100 to a function, for example secure communications. In some embodiments, Fe-GW 124 may be referred to by other names or its function performed by other resources.

FBS management server 126 represents a system resource that knows the MS memberships of each closed subscriber group (CSG) femto base station. When a new member MS is added to a CSG FBS, management server 126 is updated by the FBS.

Figure 2:
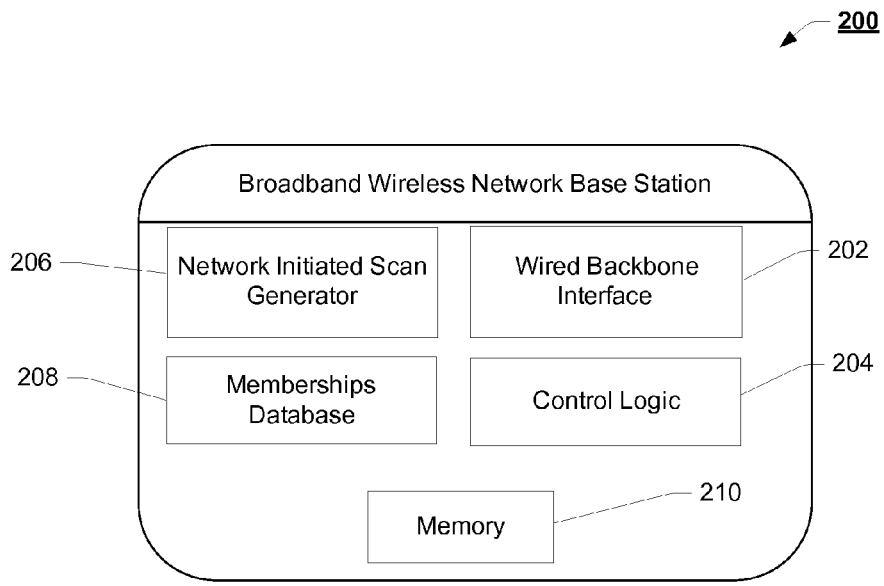
FIG. 2 is a block diagram of an example broadband wireless network base station, in accordance with one example embodiment of the invention.

FIG. 2 is a block diagram of an example broadband wireless network base station, in accordance with one example embodiment of the invention. Base station 200 may include wired backbone interface 202, control logic 204, network initiated scan generator 206, memberships database 208, and memory 210, as shown. Wired backbone interface 202 may provide base station 200 with access to wired backbone 120 and the base stations of service area 116. Base station 200, and the elements described herein, may be implemented in hardware, software or a combination of hardware and software.

Figure 4:
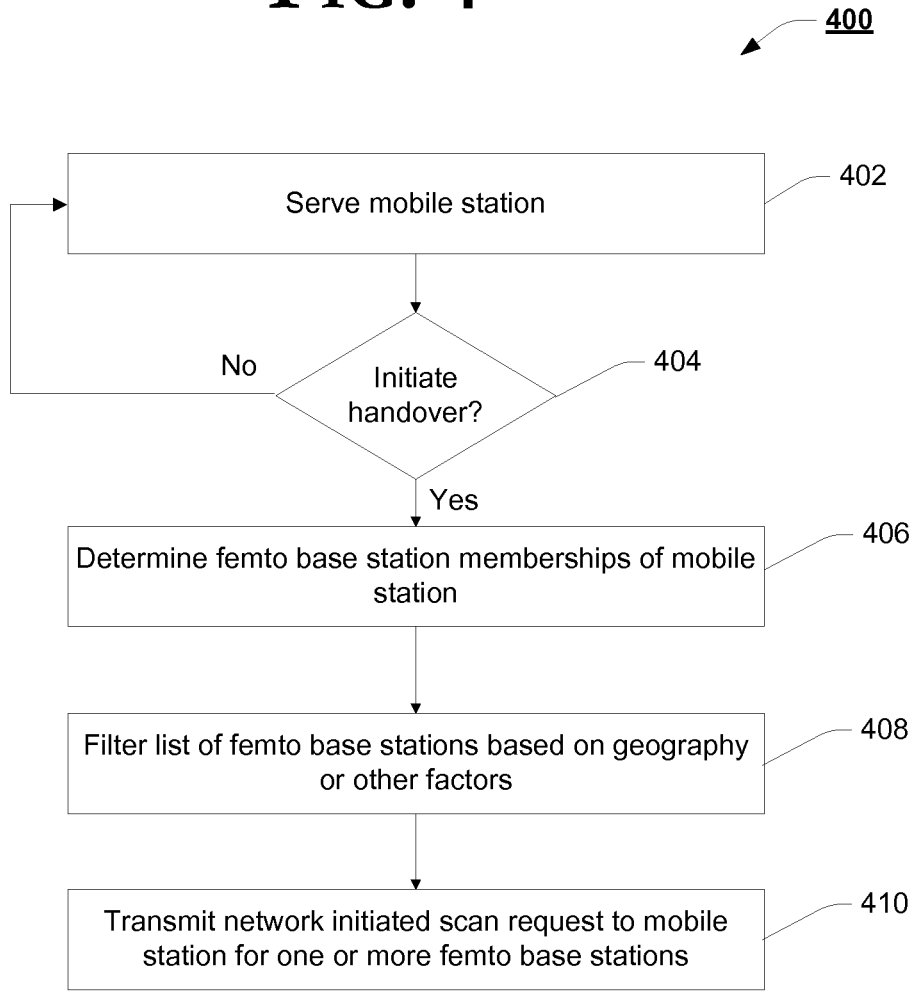
FIG. 4 is a flow chart of an example method implemented by a serving base station, in accordance with one example embodiment of the invention.

Control logic 204 may allow base station 200 to implement a method of receiving and utilizing CSG memberships of a MS, for example as described in reference to FIG. 4. Control logic 204 may represent any type of microprocessor, controller, ASIC, state machine, etc. Control logic 204 may provide base station 200 with the ability to initiate a handover of mobile station 118 (for example in response to high load of serving multiple mobile stations, not shown). Control logic 204 may utilize wired backbone interface 202 to determine CSG membership information for mobile station 118. In one embodiment, control logic 204 obtains CSG membership information for mobile station 118 from FBS management server 126. In another embodiment, control logic 204 obtains CSG membership information for mobile station 118 from another macro base station. In another embodiment, control logic 204 obtains CSG membership information for mobile station 118 from communications with mobile station 118. In another embodiment, control logic 204 obtains CSG membership information for mobile station 118 from memberships database 208, which may store previously obtained CSG membership information. Control logic 204 may also provide base station 200 with the ability to transmit a network initiated scan to mobile station 118 to request mobile station 118 scan for one or more specific femto base stations.

In one embodiment, network initiated scan generator 206 may be selectively invoked by control logic 204 to generate a request for mobile station 118 to scan for one or more femto base stations which mobile station 118 is authorized to access. In one embodiment, network initiated scan generator 206 may filter a list of femto base stations mobile station 118 is authorized to access based at least in part on the location of mobile station 118, for example one or more femto base station(s) near the GPS coordinates of mobile station 118. In another embodiment, network initiated scan generator 206 may filter a list of femto base stations mobile station 118 is authorized to access based at least in part on the location of the femto base stations, for example one or more femto base station(s) located at an address associated with mobile station 118. In another embodiment, network initiated scan generator 206 may filter a list of femto base stations mobile station 118 is authorized to access based at least in part on a default status of the femto base stations, for example one or more designated preferred femto base station(s).

Memory 210 may be present to store (either temporarily or permanently) data or instructions used to implement an example method of sharing CSG membership information as described herein.

Figure 3:
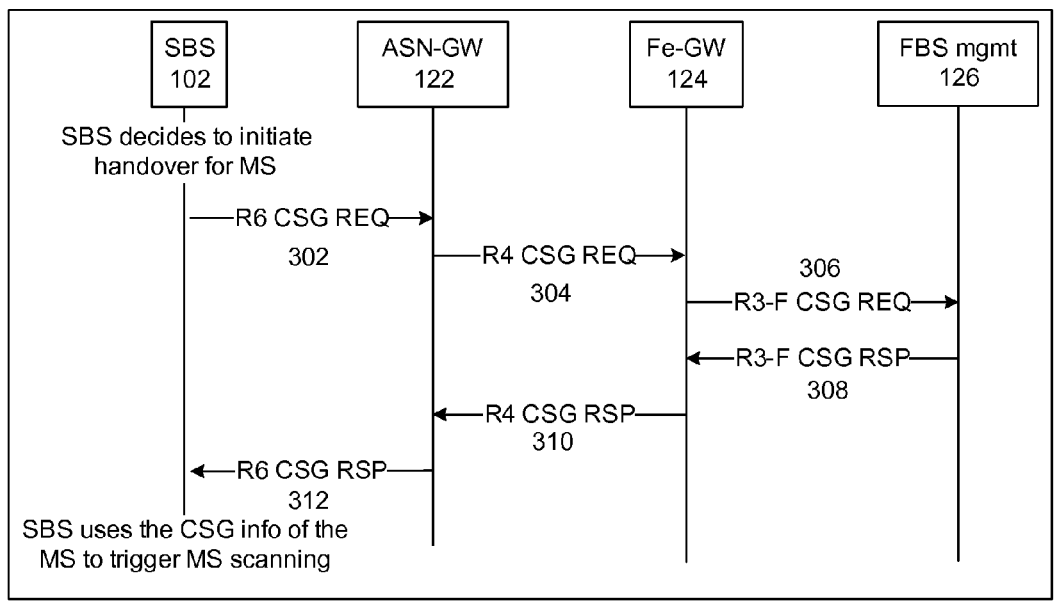
FIG. 3 is a block diagram of an example procedure to update a serving BS with the CSG memberships of a MS, in accordance with one example embodiment of the invention.

FIG. 3 is a block diagram of an example procedure to update a serving BS with the CSG memberships of a MS, in accordance with one example embodiment of the invention. In this example, serving base station 102 may initiate a handover for mobile station 118 and obtain CSG membership information for mobile station 118 by sending CSG request 302 to ASN-GW 122 on a R6 interface. ASN-GW 122 may forward CSG request 304 to Fe-GW 124 on a R4 interface, and Fe-GW 124 may forward CSG request 306 to FBS management server 126 on a R3-F interface. FBS management server 126 would retrieve the CSG membership information for mobile station 118 and send CSG response 308 to Fe-GW 124 on the R3-F interface. Fe-GW 124 would forward CSG response 310 to ASN-GW 122 on the R4 interface and ASN-GW 122 would forward CSG response 312 to SBS 102 on the R6 interface. Network initiated scan generator 206 may use the CSG membership information for mobile station 118 to generate a scan request for one or more femto base station which mobile station 118 is authorized to access.

FIG. 4 is a flow chart of an example method implemented by a serving base station, in accordance with one example embodiment of the invention. Method 400 may begin with macro base station 102 serving (402) mobile station 118. Control logic 204 may decide (404) to initiate a handover of mobile station 118. In one embodiment, control logic 204 may decide to initiate a handover of mobile station 118 to reduce a load (of multiple mobile stations, not shown).

Next, control logic 204 may determine (406) femto base station memberships of mobile station 118, for example mobile station 118 may be a CSG member of femto base stations 108 and 114, but not femto base stations 106, 110 and 112. In one embodiment, control logic 204 obtains CSG membership information for mobile station 118 from FBS management server 126. In one embodiment, control logic 204 obtains CSG membership information for mobile station 118 from macro base station 104. In one embodiment, control logic 204 obtains CSG membership information for mobile station 118 from communications with mobile station 118.

Next, network initiated scan generator 206 may filter (408) the CSG membership information for mobile station 118 to generate a scan request. In one embodiment, network initiated scan generator 206 may filter a list of femto base stations mobile station 118 is authorized to access based at least in part on the location of mobile station 118. In one embodiment, network initiated scan generator 206 may filter a list of femto base stations mobile station 118 is authorized to access based at least in part on the location of the femto base stations. In one embodiment, network initiated scan generator 206 may filter a list of femto base stations mobile station 118 is authorized to access based at least in part on a default status of the femto base stations. Finally, macro base station 102 may transmit (410) the network initiated scan request to mobile station 118 for one or more femto base stations, for example just femto base station 108.

Figure 5:
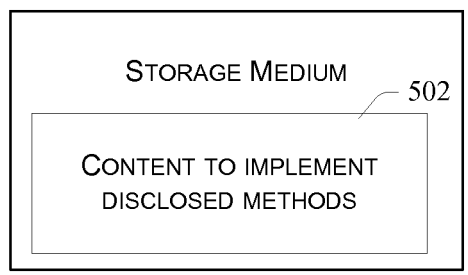
FIG. 5 is a block diagram of an example storage medium including content which, when accessed by a device, causes the device to implement one or more aspects of one or more embodiments of the invention.

FIG. 5 is a block diagram of an example storage medium including content which, when accessed by a device, causes the device to implement one or more aspects of one or more embodiments of the invention. In this regard, storage medium 500 includes content 502 (e.g., instructions, data, or any combination thereof) which, when executed, causes the system to implement one or more aspects of methods described above.

The machine-readable (storage) medium 500 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A broadband wireless network base station comprising:
    a wired backbone interface to communicate with a plurality of macro base stations and a plurality of femto base stations; and
    control logic, the control logic to:
        identify femto base stations that a mobile station is authorized to access as part of a closed subscriber group (CSG);
        filter the identified femto base stations based on at least one of a location of the mobile station, a location of the femto base station, and a default status of the femto base station, to generate a filtered list of one or more authorized femto base stations;
        generate a scan request for the mobile station that identifies one of the authorized femto base stations of the filtered list;
        transmit the scan request to cause the mobile station to scan for the femto base station identified in the scan request for handover initiation from a serving macro base station to the femto base station identified in the scan request; and
        generate and transmit another request for the mobile station to scan for another identified femto base stations of the authorized femto base stations of the filtered list when the femto base station identified in a prior scan request is not found.

2. The broadband wireless network base station of claim 1, wherein the control logic to identify one or more femto base station(s) that the mobile station is authorized to access comprises the control logic to receive femtocell membership information for the mobile station from a management server.

3. The broadband wireless network base station of claim 1, wherein the control logic to identify one or more femto base station(s) that the mobile station is authorized to access comprises the control logic to receive femtocell membership information for the mobile station from another base station.

4. The broadband wireless network base station of claim 1, wherein the control logic to identify one or more femto base station(s) that the mobile station is authorized to access comprises the control logic to receive femtocell membership information for the mobile station from the mobile station.

5. The broadband wireless network base station of claim 1, further comprising the control logic to initiate a handover of the mobile station to reduce a load of a serving macro base station by generating and transmitting the scan request, the scan request being network-initiated.

6. The broadband wireless network base station of claim 1, wherein the default status of the femto base station indicates a preferred or designated femto base station.

7. A broadband wireless network comprising:
    a plurality of femto base stations;
    a mobile station;
    a wired backbone; and
    a macro base station arranged to:
        identify femto base stations of the plurality that a mobile station is authorized to access as part of a closed subscriber group (CSG);
        filter the identified femto base stations based on at least one of a location of the mobile station, a location of the femto base station, and a default status of the femto base station, to generate a filtered list of one or more authorized femto base stations;
        generate a scan request for the mobile station that identifies one of the authorized femto base stations of the filtered list;
        transmit the scan request to cause the mobile station to scan for the femto base station identified in the scan request for handover initiation from a serving macro base station to the femto base station identified in the scan request; and
        generate and transmit another request for the mobile station to scan for another identified femto base station of the authorized femto base stations of the filtered list when the femto base station identified in a prior scan request is not found.

8. The broadband wireless network of claim 7, wherein the macro base station to identify one or more femto base station(s) that the mobile station is authorized to access comprises the macro base station to receive femtocell membership information for the mobile station from a management server.

9. The broadband wireless network of claim 7, wherein the macro base station to identify one or more femto base station(s) that the mobile station is authorized to access comprises the macro base station to receive femtocell membership information for the mobile station from another base station.

10. The broadband wireless network of claim 7, wherein the macro base station to identify one or more femto base station(s) that the mobile station is authorized to access comprises the macro base station to receive femtocell membership information for the mobile station from the mobile station.

11. The broadband wireless network of claim 7, further comprising the macro base station to initiate a handover of the mobile station to reduce a load of a serving macro base station by generating and transmitting the scan request, the scan request being network-initiated.

12. The broadband wireless network of claim 8, wherein a default status of the femto base station indicates a preferred or designated femto base station.

13. A method comprising:

serving a mobile station;

identifying femto base stations of the plurality that a mobile station is authorized to access as part of a closed subscriber group (CSG);

filtering the identified femto base stations based on at least one of a location of the mobile station, a location of the femto base station, and a default status of the femto base station, to generate a filtered list of one or more authorized femto base stations;

generating a scan request for the mobile station that identifies one of the authorized femto base stations of the filtered list;

initiating a handover by transmitting the scan request to cause the mobile station to scan for the femto base station identified in the scan request for handover initiation from a serving macro base station to the femto base station identified in the scan request; and generating and transmitting another request for the mobile station to scan for another identified femto base stations of the authorized femto base stations of the filtered list when the femto base station identified in a prior scan request is not found.

14. The method of claim 13, wherein the default status of the femto base station indicates a preferred or designated femto base station.

15. The method of claim 13, wherein determining comprises receiving femtocell membership information for the mobile station from a management server.

16. The method of claim 13, wherein determining comprises receiving femtocell membership information for the mobile station from another base station.

17. The method of claim 13, wherein determining comprises receiving femtocell membership information for the mobile station from the mobile station.

* * * * *

UNITED STATES PATENT AND TRADEMARK OFFICE
CERTIFICATE OF CORRECTION

PATENT NO. : 8,437,763 B2
APPLICATION NO. : 12/911394
DATED : May 7, 2013
INVENTOR(S) : Muthaiah Venkatachalam Page 1 of 1

It is certified that error appears in the above-identified patent and that said Letters Patent is hereby corrected as shown below:

On the Title Page

Item (56), in column 2, under "Other Publications", line 1-3, delete "International Search Report and Written Opinion received for PCT Patent Application No. PCT/US2010/053971, mailed on Jun. 29, 2011, 9 pages." and insert --"International Application Serial No. PCT/US2010/053971, International Search Report and Written Opinion mailed Jun. 29. 2011", 9 pages.--, therefor In the Claims In column 5, line 43, in claim 1, after "as", insert --a--, therefor In column 6, line 26, in claim 7, after "as", insert --a--, therefor In column 7, line 1, in claim 12, delete "claim 8" and insert --claim 7--, therefor In column 8, line 7, in claim 13, after "as", insert --a--, therefor In column 8, line 8, in claim 13, delete "stations" and insert --station--, therefor Signed and Sealed this
Twentieth Day of May, 2014

Michelle K. Lee
*Deputy Director of the United States Patent and Trademark Office*